(12) United States Patent
Yuan et al.

(10) Patent No.: US 11,438,270 B2
(45) Date of Patent: Sep. 6, 2022

(54) DATA SCHEDULING METHOD AND TOR SWITCH

(71) Applicant: Huawei Technologies Co., Ltd., Shenzhen (CN)

(72) Inventors: Tingqiu Yuan, Shenzhen (CN); Cong Xu, Beijing (CN); Tao Huang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 203 days.

(21) Appl. No.: 16/887,916

(22) Filed: May 29, 2020

(65) Prior Publication Data

US 2020/0296044 A1    Sep. 17, 2020

Related U.S. Application Data

(63) Continuation of application No. PCT/CN2018/118385, filed on Nov. 30, 2018.

(30) Foreign Application Priority Data

Nov. 30, 2017  (CN) .......................... 201711242840.9

(51) Int. Cl.
  *H04L 47/125* (2022.01)
  *H04L 45/24* (2022.01)
  *H04L 49/15* (2022.01)

(52) U.S. Cl.
  CPC ............ *H04L 47/125* (2013.01); *H04L 45/24* (2013.01); *H04L 49/15* (2013.01)

(58) Field of Classification Search
  CPC .......... H04L 49/90; H04L 47/32; H04L 47/12
  See application file for complete search history.

(56) References Cited

U.S. PATENT DOCUMENTS

| 7,275,103 B1 | 9/2007 | Thrasher et al. |
| 9,036,481 B1 | 5/2015 | White |
| 2006/0067217 A1 | 3/2006 | Li et al. |
| 2015/0207727 A1 | 7/2015 | Roy et al. |
| 2017/0295100 A1* | 10/2017 | Hira ...................... H04L 45/125 |
| 2017/0324664 A1* | 11/2017 | Xu ....................... H04L 12/4633 |

FOREIGN PATENT DOCUMENTS

| AU | 2000035316 A1 | 11/2001 |
| CN | 1756233 A | 4/2006 |
| CN | 102810118 A | 12/2012 |
| CN | 103401802 A | 11/2013 |
| CN | 104053205 A | 9/2014 |

(Continued)

OTHER PUBLICATIONS

Ghorbani, S., et al., "DRILL: Micro Load Balancing for Low-latency Data Center Networks," SIGCOMM, Aug. 21-25, 2017, Los Angeles, CA, USA, 14 pages.

(Continued)

*Primary Examiner* — Siming Liu
(74) *Attorney, Agent, or Firm* — Conley Rose, P.C.

(57) ABSTRACT

A data scheduling method is applied to a first top of rack (TOR) switch in a data center network (DCN). The data scheduling method comprises using a load of a path as a basis for data scheduling such that a load change status of the DCN can be dynamically sensed.

20 Claims, 9 Drawing Sheets

(56) References Cited

FOREIGN PATENT DOCUMENTS

| CN | 104836750 A | 8/2015 |
|---|---|---|
| CN | 105225014 A | 1/2016 |
| CN | 105227481 A | 1/2016 |
| CN | 105610709 A | 5/2016 |
| CN | 106658605 A | 5/2017 |
| CN | 106817738 A | 6/2017 |
| CN | 106899503 A | 6/2017 |
| CN | 107134137 A | 9/2017 |
| CN | 107171930 A | 9/2017 |
| JP | 2012073205 A | 4/2012 |
| WO | 2011004026 A2 | 1/2011 |

OTHER PUBLICATIONS

Yi, L., et al., "Research on Routing Selection Algorithm for Wireless Sensor Networks," Jan. 2009, 3 pages.

Wang, X., et al., "Multicast Routing Approach Based on Genetic Algorithm," Oct. 2001, 4 pages.

Alizadeh, M., et al. "CONGA: Distributed Congestion-Aware Load Balancing for Datacenters," SIGCOMM 14, Aug. 17-22, 2014, Chicago, IL, USA, 12 pages.

Katta, N., et al. "HULA: Scalable Load Balancing Using Programmable Data Planes," SOSR 16, Mar. 14-15, 2016, Santa Clara, CA, USA, 12 pages.

He, K., et al. "Presto: Edge-based Load Balancing for Fast Datacenter Networks," SIGCOMM 15, Aug. 17-21, 2015, London, United Kingdom, 14 pages.

Sen, S., et al. "Scalable, Optimal Flow Routing in Datacenters via Local Link Balancing," CoNEXT 13, Dec. 9-12, 2013, Santa Barbara, California, USA, pp. 151-162.

Zhou, J., et al. "WCMP: Weighted Cost Multipathing for Improved Fairness in Data Centers," EuroSys 2014, Apr. 13-16, 2014, pp. 1-14.

\* cited by examiner

DATA SCHEDULING METHOD AND TOR SWITCH

CROSS-REFERENCE TO RELATED APPLICATIONS

This application is a continuation of International Patent Application No. PCT/CN2018/118385, filed on Nov. 30, 2018, which claims priority to Chinese Patent Application No. 201711242840.9, filed on Nov. 30, 2017, both of which are hereby incorporated by reference in their entireties.

TECHNICAL FIELD

This application relates to the electronic information field, and in particular, to a data scheduling method and a top-of-rack (TOR) switch.

BACKGROUND

As a core infrastructure for cloud computing, a data center has received great attention in recent years. A data center network (DCN) is a bridge for connecting to large-scale servers in the data center for distributed computing.

Currently, an architecture of a commonly used DCN is shown in FIG. 1. FIG. 1 shows a fat-tree network structure. The fat-tree network structure includes a structure of three-layer topology a core switch, an aggregation switch, and a TOR switch from top to bottom. Different from a conventional tree structure, in FIG. 1, the TOR switch and the aggregation switch are classified into different clusters. In each cluster, each TOR switch is connected to each aggregation switch to form a complete bipartite graph. Each aggregation switch is connected to some core switches such that each cluster is connected to any core switch. There are a plurality of end-to-end paths between any two TOR switches, to ensure an oversubscription rate of a network, and implement high-bandwidth and non-blocking communication on the end-to-end path.

However, currently, an existing data flow scheduling scheme used to improve performance of the large-scale DCN shown in FIG. 1 cannot implement real-time load balancing of a plurality of paths in the DCN network.

SUMMARY

This application provides a data scheduling method and a TOR switch, to resolve a problem of how to implement load balancing of a plurality of paths in a large-scale DCN network.

A first aspect of this application provides a data scheduling method, applied to a first TOR switch in a DCN. The method includes receiving data whose destination address is a second TOR switch, randomly selecting candidate paths, where the candidate paths include a historical path and a preset quantity of paths that are selected from the DCN and whose start ends are the first TOR switch and termination ends are the second TOR switch, the preset quantity is an integer greater than 0, and the historical path is a path that is selected in a historical data scheduling process and used to transmit historical data and whose start end is the first TOR switch and termination end is the second TOR switch, and when the candidate paths are selected, scheduling the data to a path whose load meets a condition in the candidate paths, where the condition includes that the load is not greater than a preset threshold. Load of a path is used as a basis for data scheduling such that a load change status of the DCN can be dynamically sensed, and there is stronger adaptability to a heterogeneous DCN environment with high dynamics. Therefore, load balancing of a plurality of paths in a large-scale DCN network can be implemented.

A second aspect of this application provides a TOR switch. The TOR switch is a first TOR switch, and the first TOR switch includes a receiving module, a selection module, and a scheduling module. The receiving module is configured to receive data, where a destination address of the data is a second TOR switch. The selection module is configured to randomly select candidate paths, where the candidate paths include a historical path and a preset quantity of paths that are selected from the DCN and whose start ends are the first TOR switch and termination ends are the second TOR switch, the preset quantity is an integer greater than 0, and the historical path is a path that is selected in a historical data scheduling process and used to transmit historical data and whose start end is the first TOR switch and termination end is the second TOR switch. The scheduling module is configured to, when the candidate paths are selected, schedule the data to a path whose load meets a condition in the candidate paths, where the condition includes that the load is not greater than a preset threshold. The TOR switch can implement load balancing of a plurality of paths in a large-scale DCN network.

A third aspect of this application provides a TOR switch. The TOR switch is a first TOR switch, and the first TOR switch includes a receiver and a processor. The receiver is configured to receive data, where a destination address of the data is a second TOR switch. The processor is configured to randomly select candidate paths, where the candidate paths include a historical path and a preset quantity of paths that are selected from the DCN and whose start ends are the first TOR switch and termination ends are the second TOR switch, the preset quantity is an integer greater than 0, and the historical path is a path that is selected in a historical data scheduling process and used to transmit historical data and whose start end is the first TOR switch and termination end is the second TOR switch, and when the candidate paths are selected, schedule the data to a path whose load meets a condition in the candidate paths, where the condition includes that the load is not greater than a preset threshold.

In an implementation, before the randomly selecting candidate paths, the method further includes performing the following operations for any TOR switch in the DCN in a first period randomly selecting a first path and a second path corresponding to the TOR switch, where both the first path and the second path are paths whose start ends are the first TOR switch and termination ends are the TOR switch, obtaining a historical path corresponding to the TOR switch, where a start end of the historical path corresponding to the TOR switch is the first TOR switch, and a termination end is the TOR switch, recording, in a pre-established path status table, information about the first path corresponding to the TOR switch, the second path corresponding to the TOR switch, and the historical path corresponding to the TOR switch, and detecting and recording, in the path status table, load of the first path, load of the second path, and load of the historical path. Information and load of a path corresponding to a TOR switch are recorded in the path status table in advance, helping quickly obtain the candidate paths.

In an implementation, the randomly selecting candidate paths includes obtaining, from the path status table through querying, the first path, the second path, and the historical path corresponding to the second TOR switch, and before the scheduling the data to a path whose load meets a condition in the candidate paths, the method further includes querying, from the path status table, load of the first path corresponding to the second TOR switch, load of the second path, and load of the historical path.

In an implementation, the randomly selecting candidate paths includes randomly selecting the candidate paths when the data has not been scheduled within a preset time.

In an implementation, the method further includes scheduling, when the data has been scheduled within the preset time, the data to a path on which the data has been transmitted within the preset time.

In an implementation, the scheduling, when the data has been scheduled within the preset time, the data to a path on which the data has been transmitted within the preset time includes querying a preset flow table, and scheduling the data to a historical path corresponding to an identifier of the data in the flow table if the historical path corresponding to the identifier of the data in the preset flow table is valid, and in a second period, a process of maintaining the flow table includes, if an identifier of any piece of data in the flow table is valid in a previous period, setting the identifier of the data to invalid, or if an identifier of any piece of data in the flow table is invalid, setting a historical path corresponding to the identifier of the data to invalid.

In an implementation, the preset value is less than half of a quantity of all paths whose start ends are the first TOR switch and termination ends are the second TOR switch, to achieve a better load balancing effect.

DESCRIPTION OF EMBODIMENTS

Figure 1:
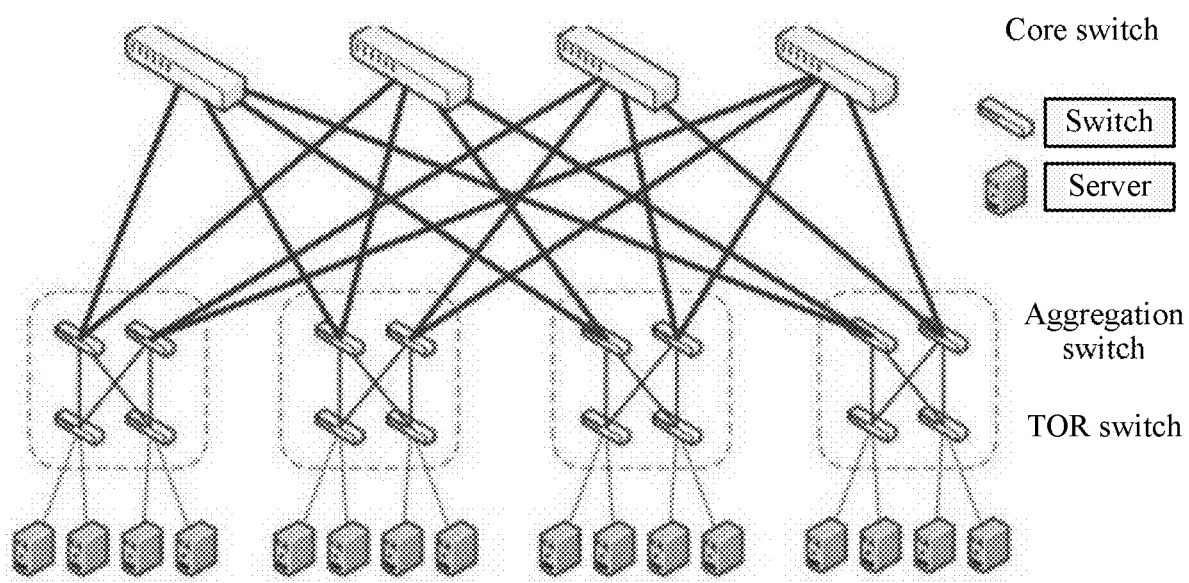
FIG. 1 is a schematic diagram of a DCN.

Different types of applications are disposed in a switch (including a core switch, an aggregation switch, and a TOR switch) in a DCN shown in FIG. 1, and the different types of applications are used to execute different services requested by a client. The DCN shown in FIG. 1 allows the different types of applications to be executed concurrently. In an application execution process, respective data is transmitted in the DCN. Therefore, in a concurrent execution process of the different types of applications, data flows in the DCN present a significantly non-uniform distribution feature, as shown in FIG. 2.

Figure 2:
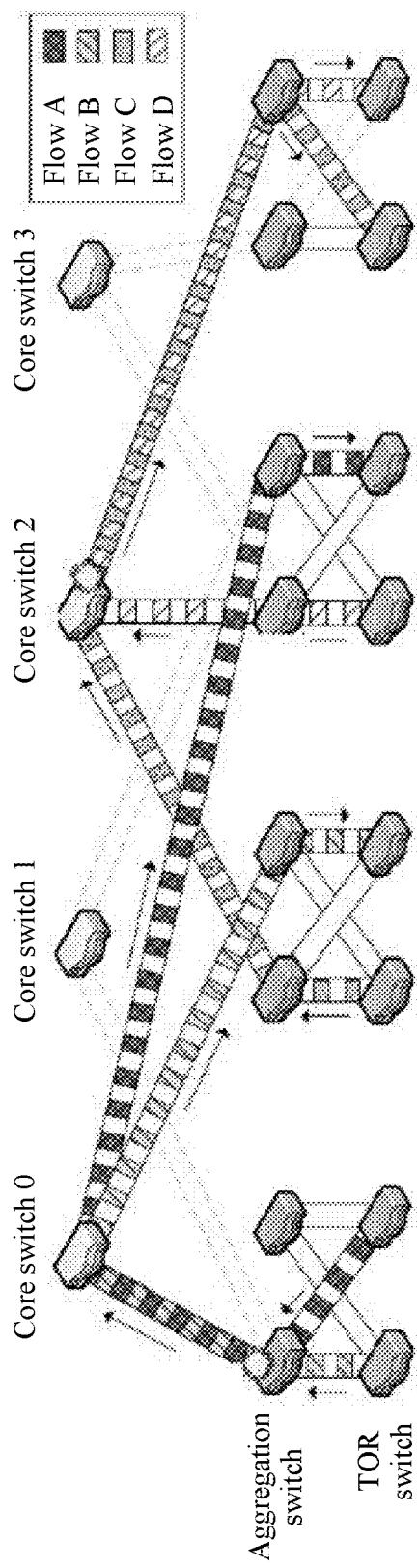
FIG. 2 is a schematic diagram of a data flow in the DCN shown in FIG. 1.

Physical switches and links shown in FIG. 1 and FIG. 2 may be heterogeneous and have different performance.

A data scheduling method shown in an embodiment of this application is applied to a TOR switch shown in FIG. 1 or FIG. 2. Neither the core switch nor the aggregation switch schedules data again. In this embodiment of this application, the "scheduling" is to allocate a transmission path to data, and transmit the data using the allocated transmission path.

In the following embodiments of this application, a scheduling granularity may be a data flow, a data packet, and a batch of data packets (a granularity between the data flow and the data packet).

The technical solutions disclosed in embodiments of this application are described in detail below with reference to the accompanying drawings. Apparently, the embodiments described below are merely some but not all of the embodiments of this application. All other embodiments obtained by a person of ordinary skill in the art based on the embodiments of this application without creative efforts shall fall within the protection scope of this application.

Figure 3:
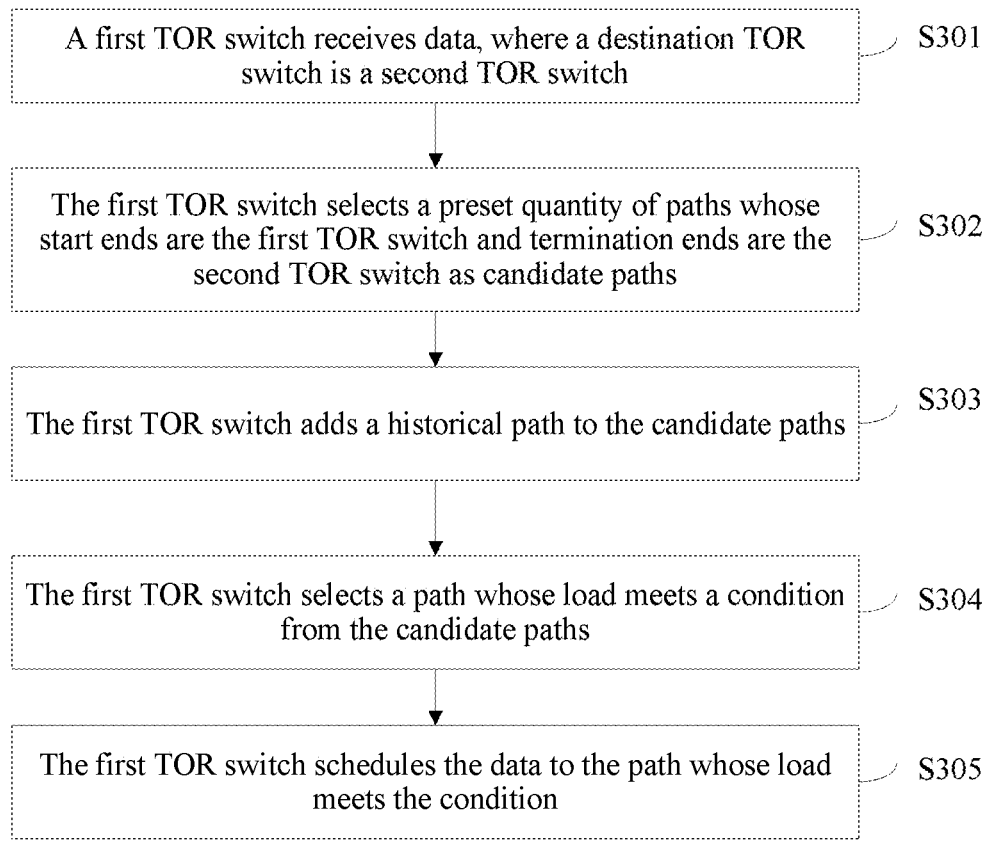
FIG. 3 is a flowchart of a data scheduling method according to an embodiment of this application.

FIG. 3 is a data scheduling method according to an embodiment of this application. The method includes the following steps.

S301. A first TOR switch receives data.

The first TOR switch is any TOR switch in FIG. 1 or FIG. 2. The data received by the first TOR switch includes address information of a destination TOR switch. For ease of distinguishing, the destination TOR switch included in the data is referred to as a second TOR switch below.

S302. The first TOR switch randomly selects a preset quantity of paths whose start ends are the first TOR switch and termination ends are the second TOR switch as candidate paths.

S303. The first TOR switch adds a historical path to the candidate paths.

The historical path is a path that is selected by the first TOR switch in a historical (for example, previous) data scheduling process and used to transmit historical data and whose start end is the first TOR switch and termination end is the second TOR switch.

The historical path is added to the candidate paths to enable the scheduling method described in this embodiment to still maintain convergence (in an embodiment, a case in which a particular path is overloaded while some other paths are in an idle mode does not occur) in an asymmetric network architecture and non-uniform job stream distribution.

S304. The first TOR switch selects a path whose load meets a condition from the candidate paths.

Specifically, a round-trip time (RTT) or a bandwidth of a path may be used to indicate load of the path. The condition includes that the load is not greater than a preset threshold. An example of the preset threshold may be a minimum value in load of the candidate paths.

For example, an RTT of a selected path is detected, and a path with a minimum RTT is used as the path whose load meets the condition.

It should be noted that, with reference to S302 and S304, it can be learned that a larger value of the preset quantity indicates more paths that need to be selected by the first TOR switch and more load values that need to be subsequently calculated. Therefore, a delay of forwarding data by the first TOR switch is higher. In addition, load of paths needs to be compared in S304, and therefore, the first TOR switch needs to store calculated load.

In addition, a relationship between the preset quantity and a load balancing effect is as follows. When a size of a data center becomes larger, time consumed to detect a path status increases, thereby increasing time of collecting path information. If a path with minimum load is selected from all paths, because a huge quantity of paths need to be detected, a delay in detecting information causes a huge fluctuation in a data backlog status of each port, and at each time point, some ports are heavily loaded while data backlog of another port is approximately zero, thereby leading to a state of severe load unbalancing.

Therefore, in actual application, the preset quantity may be determined based on a delay requirement and/or an actual status of storage space. However, in consideration of storage and calculation overheads, and to achieve a better load balancing effect, in this embodiment, the preset quantity is less than half of a quantity of all paths whose start ends are the first TOR switch and termination ends are the second TOR switch.

Based on the method described in this embodiment, data backlog amounts of all ports are strictly controlled within a fixed upper bound. In an embodiment, a load fluctuation status is far less severe than that in a case of detecting all paths, and a load balancing status is greatly improved. In particular, when only two paths are randomly detected each time, data backlog statuses of all the ports are limited to less than five data packets, and a load balancing status of a scheduling result is the best. Therefore, when a path selection range is limited to 2, the delay in detecting the information has minimum impact on the scheduling result, and this is a configuration manner most suitable to a large-scale data center. When a quantity of detected paths increases to 5, a load balancing effect deteriorates compared with that achieved when a quantity of detected paths is 2. Therefore, an applicant finds, through the foregoing research process, that randomly selecting two paths is an optimal manner.

S305. The first TOR switch schedules the data to the path whose load meets the condition.

After data scheduling is completed, the first TOR switch transmits the received data to the destination TOR switch using the path whose load meets the condition.

It can be learned from the steps shown in FIG. 3 that, when load of a path is used as a basis for scheduling data, a load change status of the DCN can be dynamically sensed, and there is stronger adaptability to a heterogeneous DCN environment with high dynamics. Therefore, performance of the DCN can be effectively improved.

More importantly, in this embodiment, only some paths whose start ends are the first TOR switch and termination ends are the destination TOR switch are selected as the candidate paths. Therefore, storage and calculation overheads can be reduced, and in addition, real-time of obtained load information relative to data transmission can be ensured. In addition, a local optimal solution (that is, the historical path) is added to the candidate paths, to ensure convergence of path selection.

Figure 4:
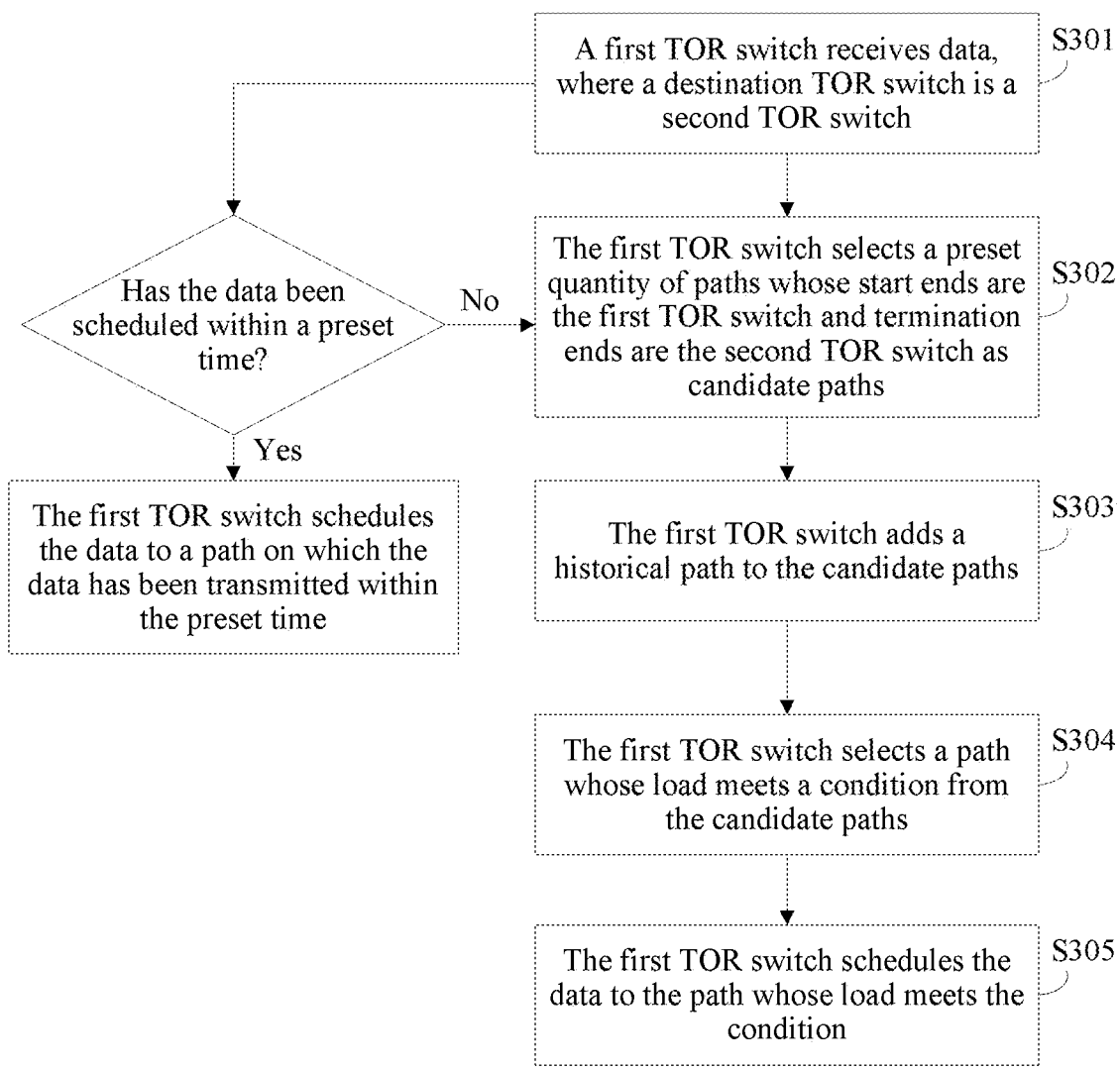
FIG. 4 is a flowchart of another data scheduling method according to an embodiment of this application.

FIG. 4 is another data scheduling method according to an embodiment of this application. A difference from the method shown in FIG. 3 is as follows.

After S301 and before S302, the first TOR switch queries whether the data has been scheduled within a preset time. If the data has been scheduled within the preset time, the first TOR switch schedules the data to a path on which the data has been transmitted within the preset time. If the data has not been scheduled within the preset time, the first TOR switch performs S302 to S304.

An objective is that when the data has been scheduled within a short period of time, there is no need to reselect a path, and a path on which the data is transmitted last time is used, to save resources of the first TOR switch.

Steps in FIG. 4 that are the same as those in FIG. 3 are not described again.

Figure 5A:
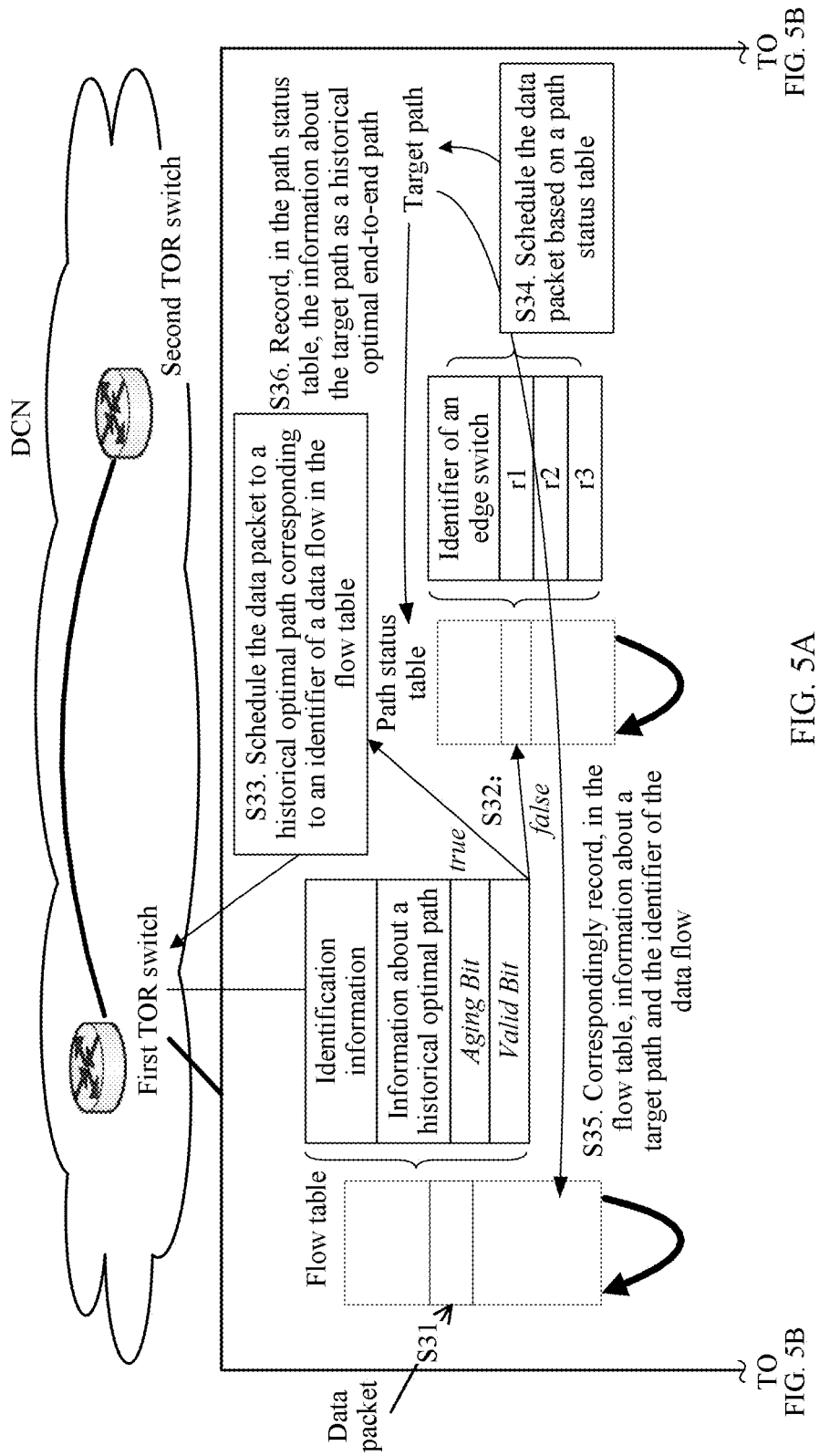
FIG. 5A and FIG. 5B are a flowchart of still another data scheduling method according to an embodiment of this application.
Figure 5B:
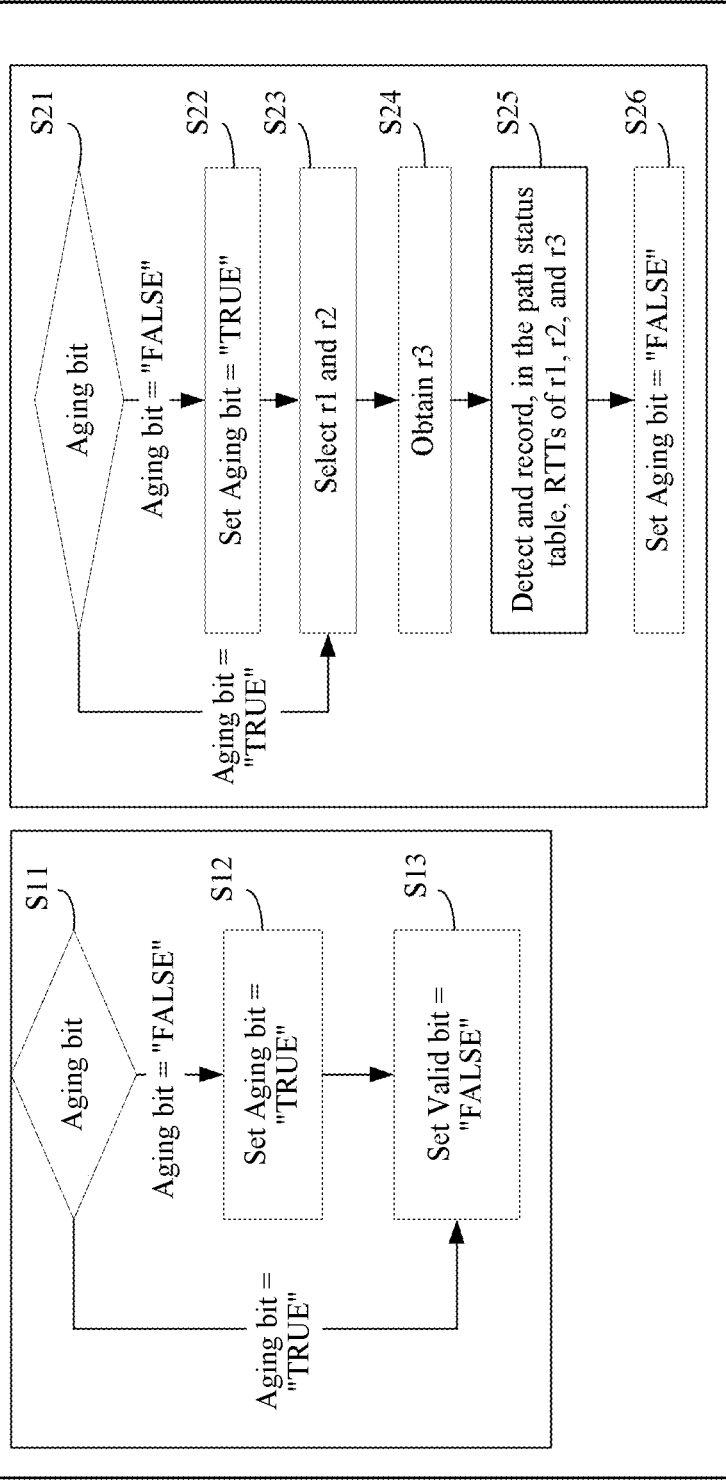

With reference to FIG. 5A and FIG. 5B, a data flow is used as an example below to describe in detail a specific implementation of each step in the method shown in FIG. 4.

In FIG. 5A and FIG. 5B, a first TOR switch stores a flow table and a path status table.

The flow table is used to store identification information of the data flow and information about a historical path of the data flow. There is a correspondence between the identification information of the data flow and the information about the historical path of the data flow. The historical path of the data flow is an end-to-end path for transmitting a data packet in the same data flow last time. An update period of data information is T1.

A process of maintaining identification information of any data flow in the flow table and a historical path corresponding to the identification information is as follows.

A timer period is set to T1. A valid identifier, Valid bit, of the historical path corresponding to the identification information of the data flow is set. When a value of the Valid bit is "TRUE", it indicates that the historical path is valid. When the value of the Valid bit is "FALSE", it indicates that the historical path is invalid. An invalid identifier, Aging bit, is set. When a value of the Aging bit is "TRUE", it indicates that information of the data flow is invalid and needs to be updated. When the value of the Aging bit is "FALSE", it indicates that the information of the data flow is valid. When the historical path of the data flow is received, an initial value of the Aging bit is set to "FALSE", and an initial value of the Valid bit is set to "TRUE".

T1 is used as a period, and the following steps are performed.

S11. Determine a value of an Aging bit, and if the Aging bit="FALSE", S12 is performed, or if the Aging bit="TRUE", S13 is performed.

S12. Set Aging bit="TRUE", and S13 is performed.

S13. Set Valid bit="FALSE".

It can be learned from S11 to S13 that valid duration of the historical path of the data flow is T1.

The path status table is used to store an identifier of each TOR switch selected by the first TOR switch and information about an optimal end-to-end path corresponding to the identifier. A start end of an optimal end-to-end path corresponding to any TOR switch is the first TOR switch, and a termination end is the TOR switch. An update period of the optimal end-to-end path is T2.

A process of maintaining the path status table is as follows.

The timer period is set to T2, and an invalid identifier, Aging bit, is set. When a value of the Aging bit is "TRUE", it indicates that the path status table is invalid and needs to be updated. When the value of the Aging bit is "FALSE", it indicates that the path status table is valid. An initial value of the Aging bit may be set to "TRUE" or "FALSE".

T2 is used as a period. For any TOR switch TOR i, the following steps are performed.

S21. Determine a value of an Aging bit, and if the Aging bit="FALSE", S22 is performed, or if the Aging bit="TRUE", S23 to S25 are performed.

S22. Set Aging bit="TRUE".

S23. A first TOR switch randomly selects two end-to-end paths r1 and r2. Start ends of r1 and r2 are the first TOR switch, and termination ends are the TOR i.

S24. Obtain a historical optimal end-to-end path r3. The historical optimal end-to-end path r3 is a path that is used to transmit data last time and whose start end is the first TOR switch and termination end is the TOR i.

S25. Detect and record, in the path status table, RTTs of r1, r2, and r3.

S26. Set Aging bit="FALSE".

It can be learned from S21 to S26 that valid duration of the optimal end-to-end path is T2, and the path status table ensures that a delay of detected real-time path status information does not exceed T2.

It should be noted that, when an RTT is used to indicate load, an upper limit value of the RTT≤T2≤T1 is met. When another parameter such as a bandwidth is used to indicate the load, a lower limit value of T2 is not limited to the upper limit value of the RTT.

A process in which the first TOR switch schedules a data flow based on the flow table and the path status table is as follows.

S31. After receiving any data packet (it is assumed that a destination address of the data packet is a second TOR switch), query, in a flow table, whether there is an identifier of a data flow in which the data packet is located, and if there is the identifier of the data flow in which the data packet is located, S32 is performed, or if there is not the identifier of the data flow in which the data packet is located, S34 is performed.

S32. If a Valid bit corresponding to the identifier of the data flow is "TRUE", S33 is performed, or if a Valid bit corresponding to the identifier of the data flow is "FALSE", S34 is performed.

S33. Schedule the data packet to a historical path corresponding to the identifier of the data flow in the flow table.

S34. Schedule the data packet based on a path status table, which further includes the following steps.

1. Query, from the path status table, end-to-end paths r11, r21, and r31 whose start ends are the first TOR switch and termination ends are the second TOR switch, and RTTs of three end-to-end paths.

2. Schedule the data packet to a path (referred to as a target path for short) with a minimum RTT in r11, r21, and r31.

In a process of transmitting the data packet using the target path, a core switch and an aggregation switch included on the target path only forward the data packet, and no longer perform a path selection operation.

S35. Correspondingly record, in the flow table, information about the target path and the identifier of the data flow. The target path is used as a historical path in this procedure.

S36. Record, in the path status table, the information about the target path as a historical optimal end-to-end path.

A sequence of S35 and a sequence of S36 may be exchanged.

S37. The first TOR switch feeds back the RTTs of r11, r21, and r31 to another TOR switch.

Specifically, the first TOR switch may send the RTTs of r11, r21, and r31 to a controller of a DCN, and the controller sends the RTTs of r11, r21, and r31 to another DCN switch.

An objective of S37 is that if another TOR switch needs to detect r11, r21, and r31, the path information table does not need to be re-queried, to improve scheduling efficiency.

It can be learned from the process shown in FIG. 3 that the first TOR switch maintains the flow table using T1 as a period, maintains the path status table using T2 as a period, and after receiving the data packet, schedules the data packet by querying the flow table and the path status table, to schedule the data packet to a path with relatively light load. Compared with an existing data flow scheduling method, the data scheduling method has the following advantages.

1. A random path status detection method is designed, and status information storage and polling overheads in a large-scale DCN are optimized.

2. A local optimal solution of each round of data scheduling is recorded, and iterates to a candidate solution of a next round, to ensure convergence of a scheduling method in a heterogeneous data center environment.

3. A random path selection range is further limited to two paths, and congestion states of only two end-to-end paths are randomly detected each time. In this detection range, a scheduling policy has lowest sensitivity to expired information, thereby greatly optimizing impact exerted on a scheduling result by the expired information.

Figure 6A:
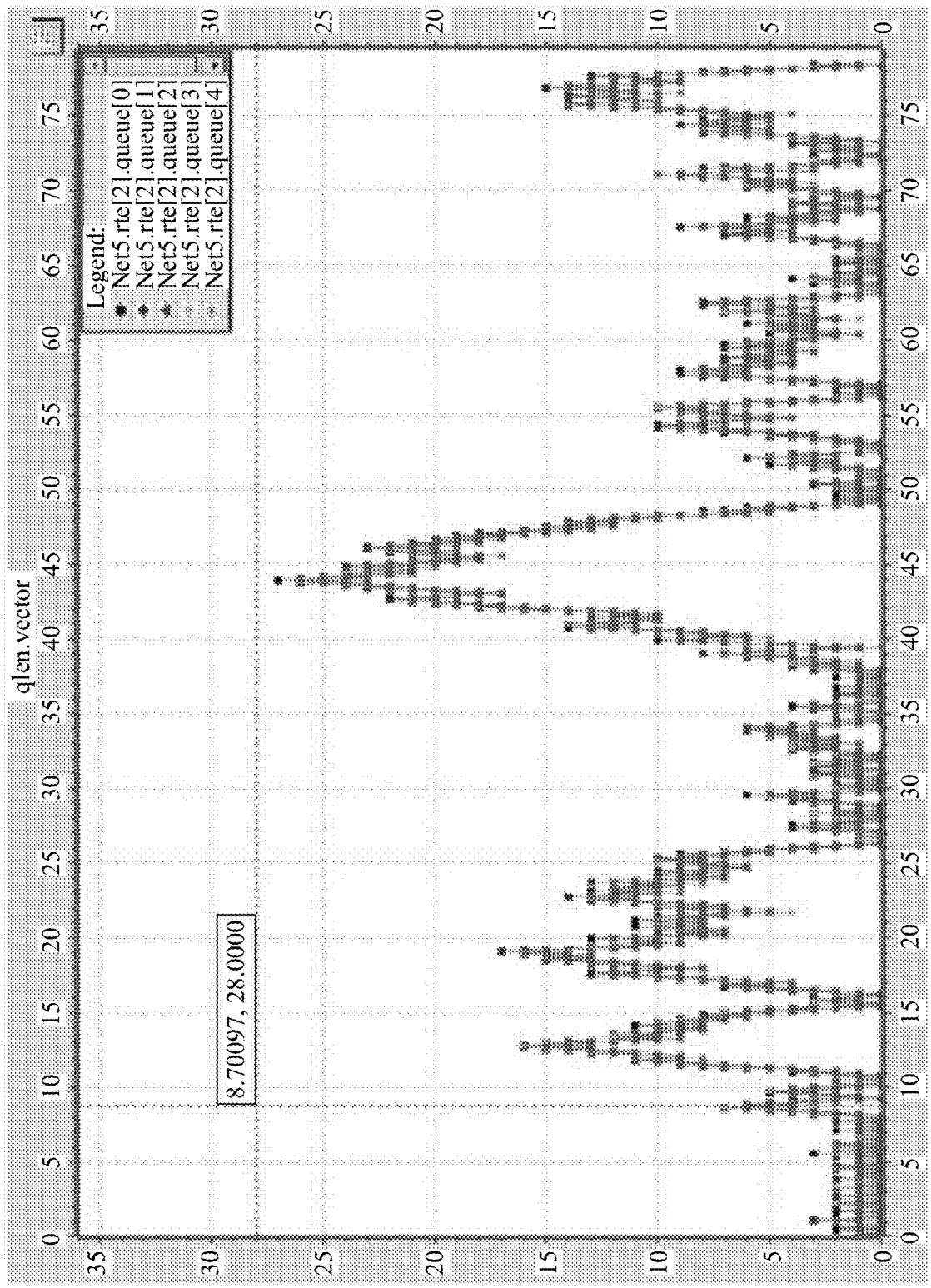
FIG. 6A and FIG. 6B are schematic diagrams of convergence effects of a data scheduling method according to an embodiment of this application.
Figure 6B:
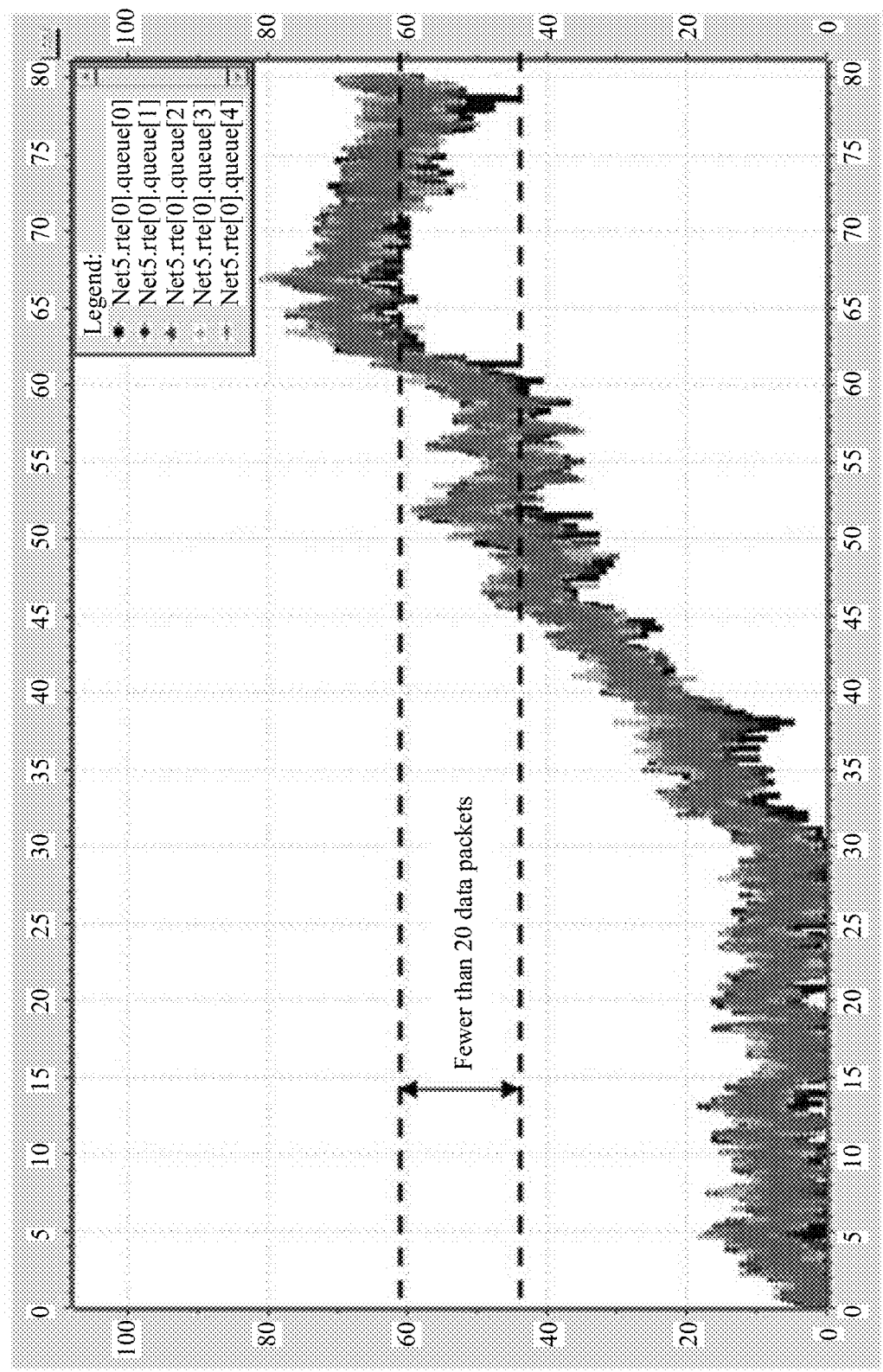

FIG. 6A and FIG. 6B is a schematic diagram of a convergence effect of the example shown in FIG. 5A and FIG. 5B.

FIG. 6A is a data backlog status of a port of a DCN TOR switch with six ports in an existing absolute load balancing scheduling policy (using absolute real-time global status information). FIG. 6B is a data backlog status of the same port in the data scheduling method shown in FIG. 5A and FIG. 5B. A horizontal axis is a data transmission time (in a unit of seconds), and a vertical axis is a backlog quantity of data packets on a port (in a unit of quantities).

It can be learned that in the absolute load balancing scheduling policy, load status change curves of ports of the TOR switch totally overlap, and this indicates that data backlog amounts of the ports are totally equal at a same moment. This is an optimal load balancing status in theory. In the method shown in FIG. 5A and FIG. 5B, although load status change curves of the ports show a specific fluctuation, there is an accurate upper limit (fewer than 20 data packets) for a difference between a data backlog amount of a port with heaviest load and a data backlog amount of a port with lightest load at any moment. Therefore, in the method shown in FIG. 5A and FIG. 5B, although only a small amount of path status information is detected and recorded, a relatively ideal load balancing status can still be achieved.

Figure 7:
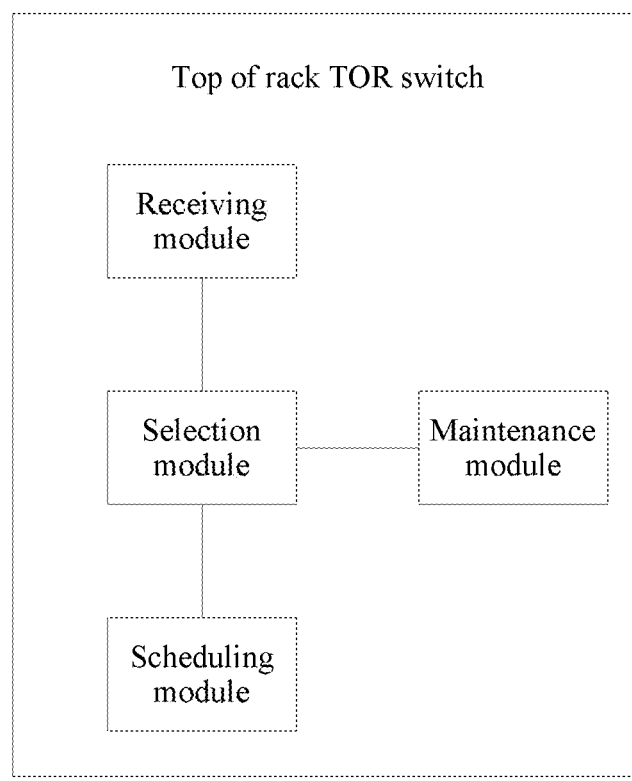
FIG. 7 is a schematic structural diagram of a TOR switch according to an embodiment of this application.

FIG. 7 is a TOR switch according to an embodiment of this application. The TOR switch is a first TOR switch, and the first TOR switch includes a receiving module, a selection module, and a scheduling module. Optionally, the first TOR switch may further include a maintenance module.

The receiving module is configured to receive data, where a destination address of the data is a second TOR switch.

The selection module is configured to randomly select candidate paths, where the candidate paths include a historical path and a preset quantity of paths that are selected from the DCN and whose start ends are the first TOR switch and termination ends are the second TOR switch, the preset quantity is an integer greater than 0, and the historical path is a path that is selected in a historical data scheduling process and used to transmit historical data and whose start end is the first TOR switch and termination end is the second TOR switch. Specifically, the selection module randomly selects the candidate paths when the data has not been scheduled within a preset time. The preset value may be less than half of a quantity of all paths whose start ends are the first TOR switch and termination ends are the second TOR switch.

The scheduling module is configured to, when the candidate paths are selected, schedule the data to a path whose load meets a condition in the candidate paths, where the condition includes that the load is not greater than a preset threshold, and schedule, when the data has been scheduled within the preset time, the data to a path on which the data has been transmitted within the preset time.

The maintenance module is configured to, before the selection module randomly selects the candidate paths, perform the following operations for any TOR switch in the DCN in a first period randomly selecting a first path and a second path corresponding to the TOR switch, where both the first path and the second path are paths whose start ends are the first TOR switch and termination ends are the TOR switch, obtaining a historical path corresponding to the TOR switch, where a start end of the historical path corresponding to the TOR switch is the first TOR switch, and a termination end is the TOR switch, recording, in a pre-established path status table, information about the first path corresponding to the TOR switch, the second path corresponding to the TOR switch, and the historical path corresponding to the TOR switch, and detecting and recording, in the path status table, load of the first path, load of the second path, and load of the historical path.

Based on the path status table maintained by the maintenance module, further, a manner in which the selection module randomly selects the candidate paths is obtaining, from the path status table through querying, the first path, the second path, and the historical path corresponding to the second TOR switch. Before the scheduling module schedules the data to the path whose load meets the condition in the candidate paths, the selection module may further query, from the path status table, load of the first path corresponding to the second TOR switch, load of the second path, and load of the historical path.

The maintenance module is further configured to maintain the flow table in a second period, and if an identifier of any piece of data in the flow table is valid in a previous period, set the identifier of the data to invalid, or if an identifier of any piece of data in the flow table is invalid, set a historical path corresponding to the identifier of the data to invalid.

Based on the flow table maintained by the maintenance module, further, a manner in which the scheduling module schedules the data to the path on which the data has been transmitted within the preset time is querying a preset flow table, and scheduling the data to a historical path corresponding to an identifier of the data in the flow table if the historical path corresponding to the identifier of the data in the preset flow table is valid.

The TOR switch can implement load balancing of a plurality of paths in a large-scale DCN network.

An embodiment of this application further discloses a TOR switch. The TOR switch is a first TOR switch, and the first TOR switch includes a receiver and a processor.

The receiver is configured to receive data, where a destination address of the data is a second TOR switch. The processor is configured to randomly select candidate paths, where the candidate paths include a historical path and a preset quantity of paths that are selected from the DCN and whose start ends are the first TOR switch and termination ends are the second TOR switch, the preset quantity is an integer greater than 0, and the historical path is a path that is selected in a historical data scheduling process and used to transmit historical data and whose start end is the first TOR switch and termination end is the second TOR switch, and when the candidate paths are selected, schedule the data to a path whose load meets a condition in the candidate paths, where the condition includes that the load is not greater than a preset threshold.

The processor is further configured to schedule, when the data has been scheduled within the preset time, the data to a path on which the data has been transmitted within the preset time.

The processor is further configured to query, from the path status table, load of the first path corresponding to the second TOR switch, load of the second path, and load of the historical path. Based on the path status table, a specific implementation in which the processor randomly selects the candidate paths is obtaining, from the path status table through querying, the first path, the second path, and the historical path corresponding to the second TOR switch.

The processor is further configured to maintain the flow table in a second period, and if an identifier of any piece of data in the flow table is valid in a previous period, set the identifier of the data to invalid, or if an identifier of any piece of data in the flow table is invalid, set a historical path corresponding to the identifier of the data to invalid. Based on the flow table, a specific implementation in which the processor schedules, when the data has been scheduled within the preset time, the data to the path on which the data has been transmitted within the preset time is querying a preset flow table, and scheduling the data to a historical path corresponding to an identifier of the data in the flow table if the historical path corresponding to the identifier of the data in the preset flow table is valid.

For a specific implementation of functions of the TOR switch, refer to the foregoing method embodiments. Details are not described herein again.

What is claimed is:

1. A data scheduling method implemented by a first top-of-rack (TOR) switch in a data center network, wherein the data scheduling method comprises:
   receiving first data from the data center network, wherein a destination address of the first data is a second TOR switch;
   randomly selecting first candidate paths from multiple paths, that comprise start ends that are the first TOR switch and termination ends that are the second TOR switch, wherein a first quantity of the first candidate paths is an integer that is greater than 0 and less than a second quantity of the multiple paths;
   selecting a previous path that was previously used to transmit second data, wherein the previous path comprises a start end that is the first TOR switch and a termination end that is the second TOR switch;
   adding the previous path to the first candidate paths to determine second candidate paths, wherein a third quantity of the second candidate paths is less than second quantity;
   subsequent to randomly selecting the first candidate paths, determining loads for the second candidate paths; and
   scheduling the first data for one of the second candidate paths comprising a load of the loads that meets a condition, wherein the condition comprises that the load is less than or equal to a preset threshold.

2. The data scheduling method of claim 1,
   wherein randomly selecting the first candidate paths comprises randomly selecting a first path and a second path, and
   wherein the data scheduling method further comprises:
      recording, in a path status table, information about the first path, the second path, and the previous; and
      recording, in the path status table, a load of the first path, a load of the second path, and a load of the previous path.

3. The data scheduling method of claim 2, further comprising:
   obtaining, from the path status table through querying, the first path, the second path, and the previous path; and
   before scheduling the first data, querying, from the path status table, the load of the first path, the load of the second path, and the load of the previous path.

4. The data scheduling method of claim 1, further comprising randomly selecting the first candidate paths in response to the first data not being scheduled within a preset time.

5. The data scheduling method of claim 4, further comprising scheduling the first data to a path on which previous data has been transmitted within the preset time in response to the first data being scheduled within the preset time.

6. The data scheduling method of claim 5, further comprising:
querying a preset flow table; and
scheduling the first data to a first previous historical path corresponding to an identifier of the first data in the preset flow table in response to the preset flow table indicating that the first previous path is valid.

7. The data scheduling method of claim 1, wherein the first quantity is less than half of a quantity of all paths with the start ends and the termination ends.

8. A first top-of-rack (TOR) switch comprising:
a processor; and
a memory coupled to the processor and storing instructions that, when executed by the processor, cause the first TOR switch to be configured to:
receive first data from a data center network, wherein a destination address of the first data is a second TOR switch;
randomly select first candidate paths from multiple paths that comprise start ends that are the first TOR switch and termination ends that are the second TOR switch, wherein a first quantity of the first candidate paths is an integer that is greater than 0 and less than a second quantity of the multiple paths;
select a previous path that was previously used to transmit second data, wherein the previous path comprises a start end that is the first TOR switch and a termination end that is the second TOR switch;
add the previous path to the first candidate paths to determine second candidate paths, wherein a third quantity of the second candidate paths is less than second quantity;
subsequent to randomly selecting the first candidate paths, determine loads for the second candidate paths; and
schedule the first data to one of the second candidate paths comprising a load of the loads that meets a condition, wherein the condition comprises that the load is less than or equal to a preset threshold.

9. The first TOR switch of claim 8,
wherein when executed by the processor, the instructions cause the first TOR switch to randomly select the first candidate paths by causing the first TOR switch to randomly select a first path and a second path, and
wherein when executed by the processor, the instructions further cause the first TOR switch to:
record, in a path status table, information about the first path, the second path, and the previous;
detect a load of the first path, a load of the second path, and a load of the previous path; and
record, in the path status table, the load of the first path, the load of the second path, and the load of the previous path.

10. The first TOR switch of claim 9, wherein the instructions further cause the first TOR switch to be configured to:
obtain, from the path status table through querying, the first path, the second path, and the previous path; and
before scheduling the first data, query, from the path status table, the load of the first path, the load of the second path, and the load of the previous path.

11. The first TOR switch of claim 8, wherein the instructions further cause the first TOR switch to be configured to randomly select the first candidate paths when the first data has not been scheduled within a preset time.

12. The first TOR switch of claim 11, wherein the instructions further cause the first TOR switch to be configured to schedule the first data to a path on which previous data has been transmitted within the preset time when the first data has been scheduled within the preset time.

13. The first TOR switch of claim 12, wherein the instructions further cause the first TOR switch to be configured to:
query a preset flow table; and
schedule the first data to a first previous historical path corresponding to an identifier of the first data in the flow table when the preset flow table indicates that the first previous path is valid.

14. The first TOR switch of claim 8, wherein the first quantity is less than half of a quantity of all paths with the start ends and the termination ends.

15. A computer program product comprising computer-executable instructions for storage on a non-transitory computer-readable medium that, when executed by a processor, cause a first top-of-rack (TOR) switch apparatus to:
receive first data from a data center network, wherein a destination address of the first data is a second TOR switch;
randomly select first candidate paths from multiple paths that comprise start ends that are the first TOR switch and termination ends that are the second TOR switch, wherein a first quantity of the first candidate paths is an integer that is greater than 0 and that is less than a second quantity of the multiple paths;
select a previous path that was previously used to transmit second data, wherein the previous path comprises a start end that is the first TOR switch and a termination end that is the second TOR switch;
add the previous path to the first candidate paths to determine second candidate paths, wherein a third quantity of the second candidate paths is less than second quantity;
subsequent to randomly selecting the first candidate paths, determine loads for the second candidate paths; and
schedule the first data to one of the second candidate paths comprising a load of the loads that meets a condition, wherein the condition comprises that the load is less than or equal to a preset threshold.

16. The computer program product of claim 15,
wherein when executed by the processor, the instructions cause the first TOR switch to randomly select the first candidate paths by causing the first TOR switch to randomly select a first path and a second path, and
wherein when executed by the processor, the instructions further cause the first TOR switch to:
record, in a path status table, information about the first path, the second path, and the previous;
detect a load of the first path, a load of the second path, and a load of the previous path; and
record, in the path status table, the load of the first path, the load of the second path, and the load of the previous path.

17. The computer program product of claim 16, wherein the instructions further cause the first TOR switch to:
obtain, from the path status table through querying, the first path, the second path, and the previous path; and
before scheduling the first data, query, from the path status table, the load of the first path, the load of the second path, and the load of the previous path.

18. The computer program product of claim 15, wherein the instructions further cause the first TOR switch to randomly select the first candidate paths when the first data has not been scheduled within a preset time.

19. The computer program product of claim 18, wherein the instructions further cause the first TOR switch to schedule the first data to a path on which previous data has been transmitted within the preset time when the first data has been scheduled within the preset time.

20. The computer program product of claim 19, wherein the instructions further cause the first TOR switch to:
   query a preset flow table; and
   schedule the first data to a first previous path corresponding to an identifier of the first data in the preset flow table when the first previous path is valid.

* * * * *

UNITED STATES PATENT AND TRADEMARK OFFICE
CERTIFICATE OF CORRECTION

PATENT NO. : 11,438,270 B2
APPLICATION NO. : 16/887916
DATED : September 6, 2022
INVENTOR(S) : Tingqiu Yuan, Cong Xu and Tao Huang Page 1 of 1

It is certified that error appears in the above-identified patent and that said Letters Patent is hereby corrected as shown below:

In the Claims

Claim 6, Column 11, Line 8: "previous historical path" should read "previous path"

Claim 13, Column 12, Line 12: "previous historical path" should read "previous path"

Signed and Sealed this
Eighth Day of November, 2022

Katherine Kelly Vidal
*Director of the United States Patent and Trademark Office*